United States Patent [19]

Kaneko

[11] 4,281,544

[45] Aug. 4, 1981

[54] TEMPERATURE DETECTING DEVICE

[75] Inventor: Noboru Kaneko, Tokyo, Japan

[73] Assignee: Kabushiki Kaisha Daini Seikosha, Tokyo, Japan

[21] Appl. No.: 46,053

[22] Filed: Jun. 6, 1979

[30] Foreign Application Priority Data

Jun. 9, 1978 [JP] Japan .................................. 53/69507

[51] Int. Cl.³ ............................................. G01K 7/20
[52] U.S. Cl. ............................................. 73/362 SC
[58] Field of Search ........ 73/362 SC, 362 R, 362 CP, 73/362 AR

[56] References Cited

U.S. PATENT DOCUMENTS

| | | | |
|---|---|---|---|
| 4,121,461 | 10/1978 | Butler et al. ...................... | 73/362 SC |
| 4,165,642 | 8/1979 | Lipp ................................. | 73/362 SC |

*Primary Examiner*—Jerry W. Myracle
*Attorney, Agent, or Firm*—Robert E. Burns; Emmanuel J. Lobato; Bruce L. Adams

[57] ABSTRACT

A temperature detecting device comprises a temperature detecting element such as a thermistor for sensing temperature changes and a MOS-transistor connected in series with the temperature detecting element. A constant voltage source maintains a constant reference voltage. A voltage comparing circuit compares the voltage across the MOS-transistor or the voltage across the temperature detecting element with the constant reference voltage during periods when the MOS-transistor is turned ON and produces an output signal representative of the temperature. A plurality of MOS-transistors can be used in which case they are connected in parallel with each other and are connected in series with the temperature detecting element. The plurality of MOS-transistors are sequentially turned ON to enable the voltage comparing circuit to compare either the voltages across the MOS-transistors or the voltage across the temperature detecting element with the constant reference voltage during the periods when the MOS-transistors are turned ON.

6 Claims, 8 Drawing Figures

TEMPERATURE DETECTING DEVICE

BACKGROUND OF THE INVENTION

The present invention relates generally to a temperature detecting device, and more particularly, to a temperature detecting device employing a thermistor as a temperature detecting element.

In the case of controlling the temperature of various devices within a broad temperature range, it is necessary to provide a temperature detecting device. A temperature detecting device of the conventional type is, shown in FIG. 1. However, in this device, it is necessary to provide a number of voltage comparing circuits. Therefore, such detecting circuits occupy a large area when formed by integrating them as an IC together with other circuits having other functions.

Another temperature detecting circuit is shown in FIG. 2 and this is a more recent circuit construction having one voltage comparing circuit, however a plurality of such temperature detecting circuits are employed in the conventional type. However, the circuit construction shown in FIG. 2 is not suitable for completely forming the same by C-MOS IC.

In the circuitry of FIG. 2, the input operational voltage range of a voltage comparing circuit constructed by C-MOS is limited by the threshold voltage of the MOS-transistor and the change in voltage "Vt" as a function of changes in temperature is shown in FIG. 3 according to the non-linearity of a thermistor as a temperature detecting element. As can be seen in FIG. 3, the change in voltage "ΔVt" of the voltage "Vt" for a unit change in temperature (1° C.) becomes remarkably smaller when the temperature becomes higher. Therefore, the accuracy of the temperature reference voltage for comparing the voltage "Vt" is necessarily high. Further, it is necessary to accurately determine the resistance dividing ratio for generating the reference voltage and to make smaller the ON-resistance of the switching element. If an MOS-transistor is employed as the switching element, it is necessary to fabricate a transistor having a broad channel width for resuming the ON-resistance thereof, and accordingly the area occupied by the transistor on the IC-chip becomes larger.

The present invention aims to eliminate the above noted drawbacks and, therefore, an object of the present invention is to provide a temperature detecting circuit having a high detection accuracy without occupying a large area of the IC.

Figure 4:
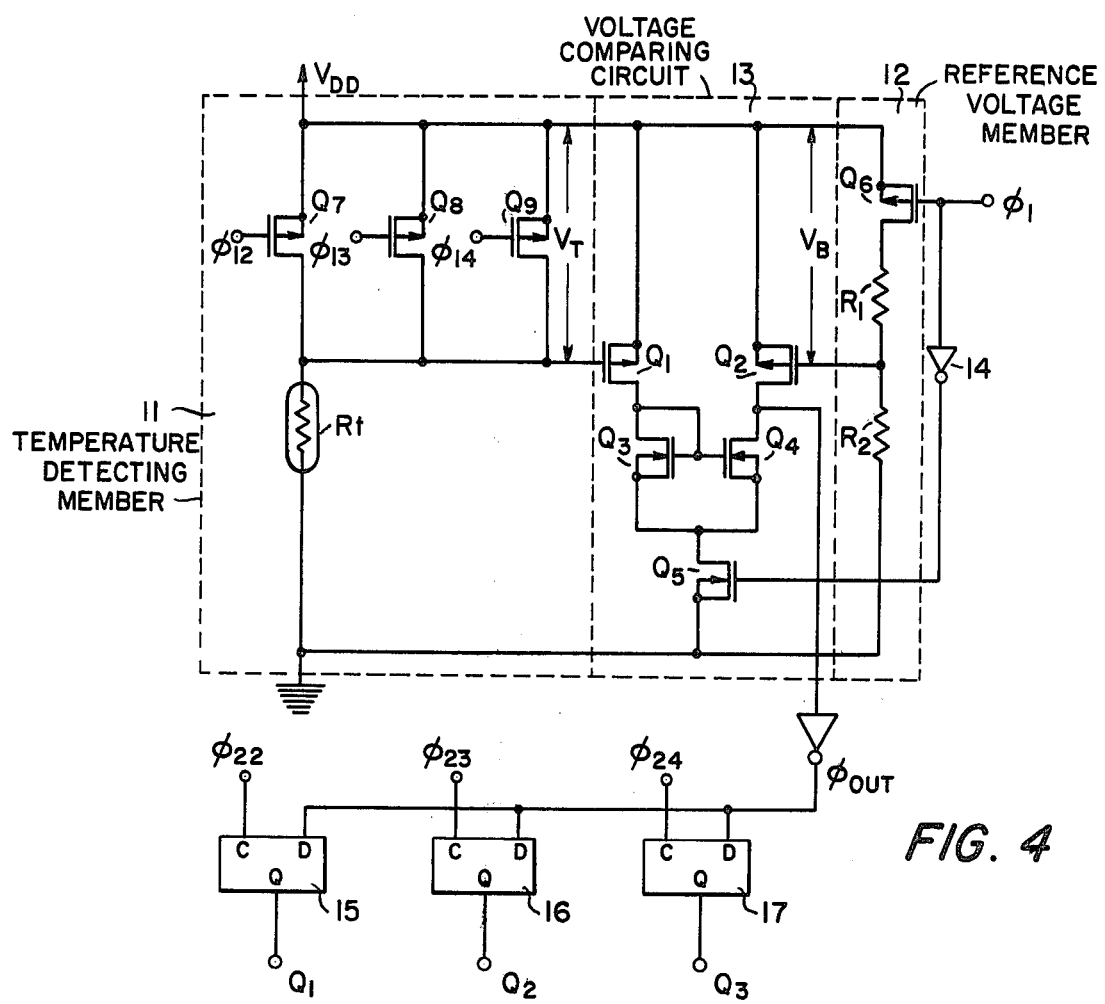
FIGS. 4 and 6A show circuit constructions of the present invention.

The temperature detecting circuit of the present invention is shown in FIG. 4 and is composed of a temperature detecting member 11, the resistors $R_1$ and $R_2$, a reference voltage member 12 for generating a certain reference voltage according to the resistance ratio of the resistors $R_1$ and $R_2$ and a voltage comparing circuit 13 for comparing a voltage "Vt" of the temperature detecting member 11 and a reference voltage "Vb" of the reference voltage member 12. The temperature detecting member 11 is composed of a temperature detecting element such as a thermistor "Rt" and P-MOS transistors Q7, Q8 and Q9 which are connected in parallel to each other and are connected in series with the thermistor "Rt". Further, a latch circuit which functions as a memory circuit for controlling and temporarily memorizing the output of the voltage comparing circuit 13 of the temperature detecting circuit is included in the temperature detecting circuit.

A description will now be given of the basic operation of the temperature detecting circuit of the present invention as shown in FIG. 4.

Figure 5:
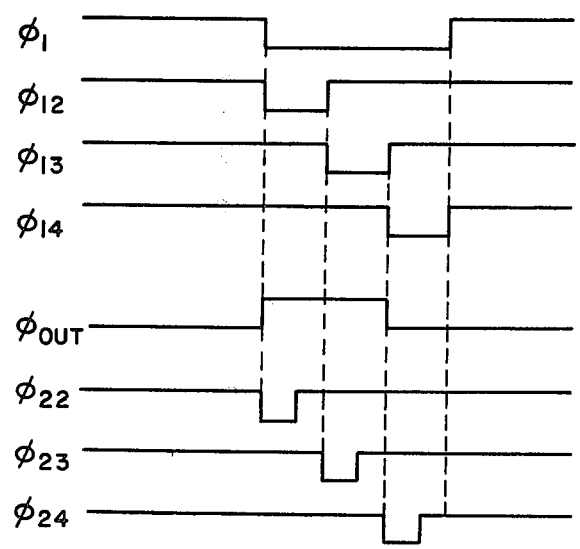
FIGS. 5, 6 and 7 show a time-chart and temperature-voltage characteristic curves for explaining the operation of the temperature detecting circuit of the present invention.

Transistors Q5 and Q6 are switching transistors and a signal $\phi 1$ (see--, insert--) FIG. 5 is applied to the gate electrode of the transistor Q6. The signal $\phi$ is also inverted by a inverter circuit 14 and the inverted signal applied to the gate electrode of the transistor Q5. The timing signals $\phi 12$, $\phi 13$ and $\phi 14$ are applied to the gate electrodes of transistors Q7, Q8 and Q9. The transistors Q7, Q8 and Q9 are sequentially turned ON by each application of the timing signals $\phi 12$, $\phi 13$ and $\phi 14$. As to the voltage between the end terminals of the transistors Q7, Q8 and Q9, the voltage of the transistor Q7 is designed so as to be "Vt=Vb" in the ON condition of the transistor Q7 at 15° C., the voltage of the transistor Q8 is designed so as to be "Vt=Vb" in the ON condition of the transistor Q8 at 25° C., and the voltage of the transistor Q9 is designed so as to be "Vt=Vb" in the ON condition of the transistor at 30° C.

Figure 6:
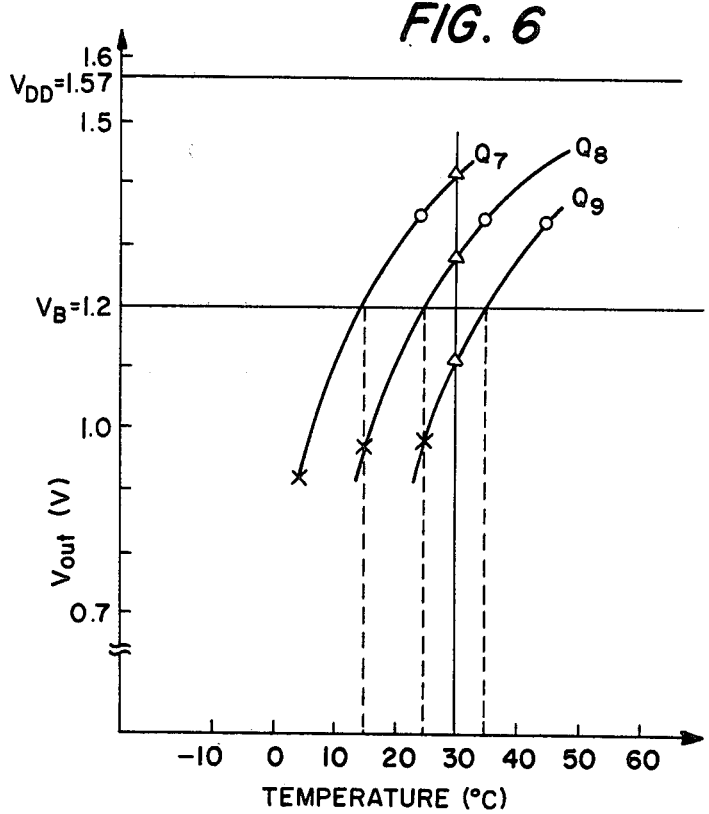
Figure 6A:
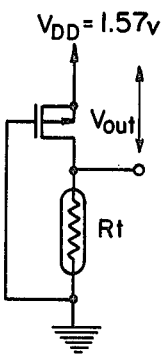

In the case of designing the transistors Q7, Q8 and Q9, the voltages between the end terminals of the respective transistors Q7, Q8 and Q9 vary in the manner shown in FIG. 6 according to temperature variations. For example, at 30° C., when the transistors Q7, Q8 and Q9 are sequentially turned ON by the signals $\phi 12$, $\phi 13$ and $\phi 14$, the voltages "Vt" between the end terminals of the transistors have the voltage value as indicated by Δ mark in FIG. 6. Therefore, during the ON-condition of transistors Q7 and Q8, the relation between "Vt" and "Vb" becomes Vt>Vb whereas in the case of the ON condition of the transistor Q9, a the relation between "Vt" and "Vb" becomes Vt<Vb.

The output signal $\phi$out of the voltage comparing circuit 13 is as shown in FIG. 5. Namely, the signals $\phi 12$ and $\phi 13$ are maintained at LOW-level, and the signal $\phi$out is at HIGH-level. The signal $\phi 14$ is maintained at LOW-level, and the signal $\phi$out becomes LOW level. The level of the output signal $\phi$out is different between the LOW-level of the signal $\phi 13$ and the LOW-level of the signal $\phi 14$. Further, the transistor Q8 controlled by the signal $\phi 13$ is designed so that "$V_T = V_B$" at 25° C., and the transistor Q9 controlled by the signal $\phi 14$ is designed so that "$V_T = V_B$" at 35° C., whereby the temperature is maintained between 25° C. -35° C. by the output signal $\phi$out.

Referring now to the temperature detecting member 11 the voltage comparing circuit 13 is composed of C-MOS construction, whereby the input voltage is limited, and if the transistors Q7, Q8 and Q9 are operated in their saturated area, the voltage between or across both end terminals of each transistor is as follows:

$$V_T = V_C - K_P \cdot R_t(T)(V_{GS} - V_{TP})^2 \quad (1)$$

$V_C$: Power source voltage $K_P$: electro-conductive coefficient $Rt(T)$: resistance value at a temperature T° C. of thermistor "Rt"

$V_{GS}$: voltage between gate and source electrodes of transistor $V_{TP}$: threshold voltage of transistor, the "$K_P$" of the transistors Q7, Q8 and Q9 is designed so as to be "$V_T = V_B$" at each of the detection temperatures 15° C., 25° C. and 30° C. At this time, the relation between temperature and resistance value of the thermistor "Rt" is as follows:

$$Rt(T) = Rt(To) \, 1 \times P^B \left( \frac{1}{T} - \frac{1}{To} \right) \quad (2)$$

T: absolute temperature = 273, 15K $T_o$: reference temperature = 298,15K (25° C.)

$Rt(T_o)$: resistance value of thermistor "Rt" at the reference temperature $T_o$.

Thus it is possible to calculate the value of "$K_P$" by the resistance value of the thermistor "Rt" for any given temperature.

However the "$K_P$" value and "$V_P$" value of a transistor often deviate from the design value because of the irregularity of the manufacturing process of each of the IC-chips. However, it is possible to eliminate the above noted irregularity of the values "$K_P$" and "$V_{TP}$" by suitably selecting the resistance value "Rt" of the thermistor "Rt" in formula (1).

The values "$K_P$" of the transistors Q7, Q8 and Q9 often vary somewhat from the original design value, however the relative ratio of each value "$K_P$", i, e, "$K_P7$" which represents the value "$K_P$" of transistor Q7, "$K_P8$" of value "$K_P$" of transistor Q8 and "$K_P9$" of value "$K_P$" of transistor Q9, is not changed by any irregularity in the fabrication process, whereby the transistors may be made.

The values "$V_{TP}$" and "$K_P$" as parameters of the transistors are merely changed according to changes in temperature, such changes being dependent on the change of mobility of the semi-conductor, whereby changes of the values "$V_{TP}$" and "$K_P$" due to temperature changes are constantly acknowledged. It is very easy to design the value "$K_P$" of the transistors Q7–Q9 by taking into consideration the temperature change and corresponding changes of the values "$V_{TP}$" and "$K_P$".

However there is little irregularity of the value "$V_{TP}$" according to the fabrication process and there is a change of the value "$V_{TP}$" according to temperature change so that the value "$V_T$" deviates from the design value if the temperature deviates from a predetermined temperature even if the resistance value of the thermistor "Rt" is determined at a certain temperature.

Namely, the values "$V_{TP}$" of the transistors Q7, Q8 and Q9 are designed so as to design the value "$K_P$" at a predetermined value, however, the relation between "$V_T$" and "$V_B$" becomes "$V_T = V_B$" at 15° C. and 35° C. if the thermistor "Rt" at 25° C. is determined so that the relation between "$V_T$" and "$V_B$" becomes "$V_T = V_B$" for the transistor Q8. Error of temperature detection according to the irregularity of the value "$V_{TP}$" is maintained within ±0.3° C. between 0° C.–50° C. and the error remarkably becomes smaller at the detection temperatures 15° C., 25° C. and 35° C.

Figure 1:
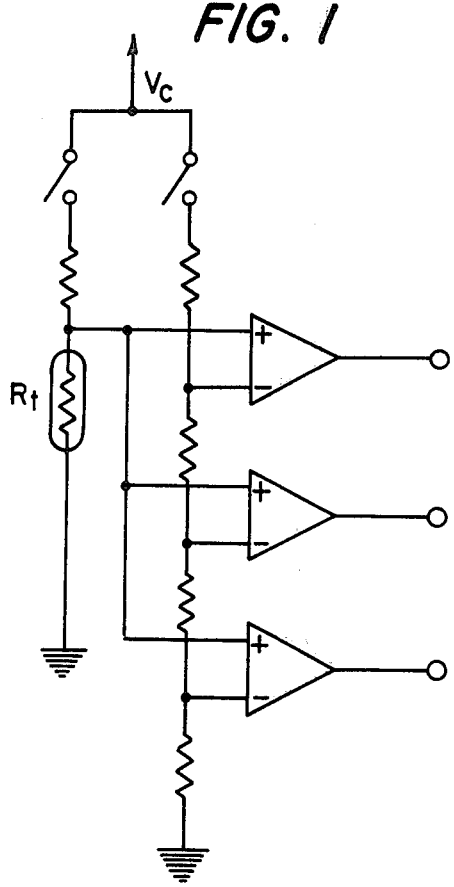
FIGS. 1 and 2 show two embodiments of conventional circuit constructions.
Figure 2:
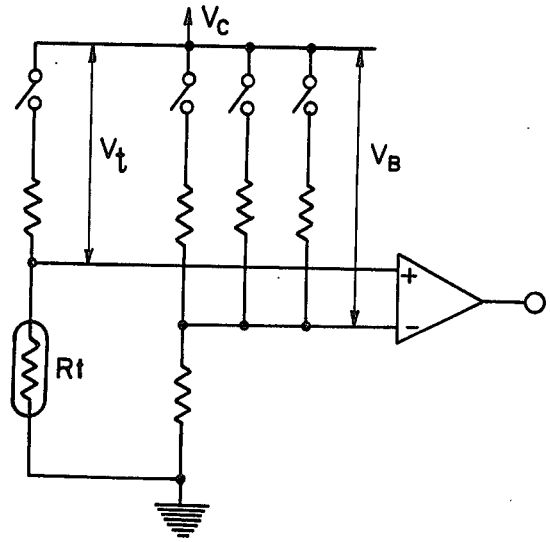
Figure 3:
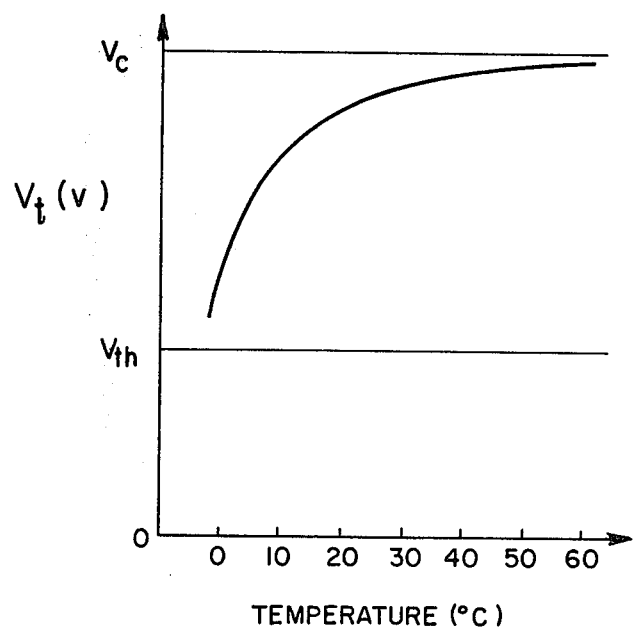
FIG. 3 shows a temperature voltage characteristic curve of the conventional type circuit.
Figure 7:
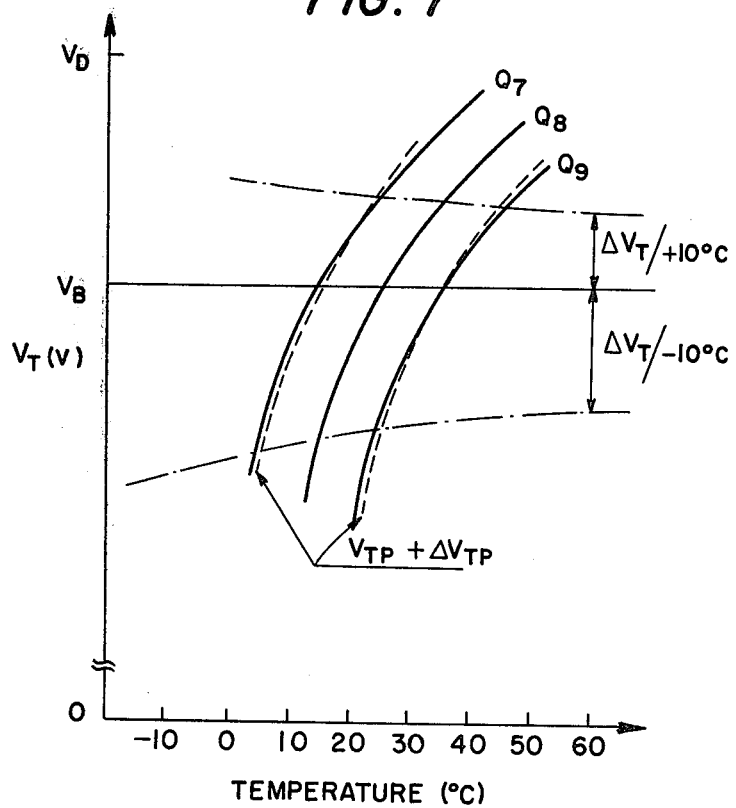

FIG. 7 shows the above noted condition. According to the present invention, the voltage characteristic "$V_B$" by the voltage comparing circuit 13. Therefore, a change in voltage "$v_{VT}$" for a change in temperature in the neighborhood of the reference voltage "V" of the voltage characteristic "$V_T$" is very large, and thus the accuracy required for the reference voltage "$V_B$" is not so severe as in the case of the temperature detecting circuits of FIG. 1 and FIG. 2. In accordance with the invention, it is possible to obtain the accuracy of temperature detection by loosing one figure in the accuracy of the reference voltage "$V_B$" while obtaining the same accuracy of temperature detection as in the case of the detecting circuit in FIGS. 1 and 2. The above noted detecting condition is remarkable when the detection temperature has a wide range from low range to high range.

In case of detecting a voltage characteristic "$V_T$" of 50° C., there is allowance for more than one figure, such as ±1° C./0.08V, according to the detecting circuit of the present invention, whereby the area occupied by the switching transistor Q6 on the semi-conductor chip becomes smaller.

Reference has been made to the operation in the saturated region of a P-channel MOS-transistor, however, it is also possible to use the combination of an N-channel MOS-transistor and thermistor with the same accuracy of temperature detection as in level the case of a P-channel MOS-transistor.

According to the present invention, the number of elements in the whole circuit is reduced by using only one voltage comparing circuit. Further, the invention enables construction of a highly accurate temperature detecting circuit occupies a very small area of IC the chip thereby permitting other circuits having other functions to be fabricated on one semi-conductor chip.

I claim:

1. A temperature detecting device comprising in combination: a temperature detecting element having a resistance characteristic which varies as a function of temperature for sensing the temperature; a MOS-transistor connected in series with the temperature detecting element; a constant voltage source for maintaining a constant voltage; means for applying a timing signal to said MOS-transistor to turn ON said MOS-transistor; and a voltage comparing circuit for comparing the voltage across said MOS-transistor or the voltage across said temperature detecting element with the constant voltage of the constant voltage source when the MOS-transistor is turned ON by the timing signal and for producing an output signal representative of the temperature.

2. A temperature detecting device as claimed in claim 1; wherein said temperature detecting element comprises a thermistor.

3. A temperature detecting device as claimed in claim 1 or claim 2; further comprising a latch circuit for temporarily memorizing the output signal produced by the voltage comparing circuit.

4. A temperature detecting device comprising in combination: a temperature detecting element having a resistance characteristic which varies as a function of temperature for sensing the temperature; a plurality of MOS-transistors connected in parallel with each other and connected in series with the temperature detecting element; a constant voltage source for maintaining a constant voltage; means for sequentially applying timing signals to said MOS-transistors to sequentially turn ON said MOS-transistors; and a voltage comparing circuit for comparing either the voltages across the MOS-transistors or the voltage across the temperature detecting element with the constant voltage of the constant voltage source when the MOS-transistors are turned ON by the timing signals and for producing an output signal representative of the temperature.

5. A temperature detecting device as claimed in claim 4; wherein said temperature detecting element comprises a thermistor.

6. A temperature detecting device as claimed in claim 4 or claim 5; further comprising a latch circuit for temporarily memorizing the output signal produced by the voltage comparing circuit.

* * * * *